US009284684B2

(12) United States Patent
Grogan et al.

(10) Patent No.: US 9,284,684 B2
(45) Date of Patent: Mar. 15, 2016

(54) FLARED INLET INSERT FOR INTRODUCING FLOW INTO A FLASH TANK

(71) Applicant: Andritz Inc., Glens Falls, NY (US)

(72) Inventors: Richard M. Grogan, Queensbury, NY (US); Walter Edward Nellis, Queensbury, NY (US); Tyson Bradford Hunt, Saratoga Springs, NY (US)

(73) Assignee: Andritz Inc., Glens Falls, NY (US)

( * ) Notice: Subject to any disclaimer, the term of this patent is extended or adjusted under 35 U.S.C. 154(b) by 0 days.

(21) Appl. No.: 14/800,781

(22) Filed: Jul. 16, 2015

(65) Prior Publication Data

US 2015/0315745 A1    Nov. 5, 2015

Related U.S. Application Data

(63) Continuation of application No. 14/272,941, filed on May 8, 2014, now Pat. No. 9,127,403.

(60) Provisional application No. 61/827,830, filed on May 28, 2013.

(51) Int. Cl.
*D21C 11/00* (2006.01)
*D21C 11/10* (2006.01)
*B01D 19/00* (2006.01)
(Continued)

(52) U.S. Cl.
CPC ............ *D21C 11/00* (2013.01); *B01D 19/0036* (2013.01); *D21C 11/04* (2013.01); *D21C 11/06* (2013.01); *D21C 11/10* (2013.01)

(58) Field of Classification Search
CPC ............ D21C 7/10; D21C 7/14; D21C 11/00; D21C 7/12; D21C 11/0071; D21C 1/00; D21C 7/06; D21C 11/04; D21C 11/06; D21C 11/10; D21C 3/24; B01D 19/0036; F25B 2400/23

See application file for complete search history.

(56) References Cited

U.S. PATENT DOCUMENTS

| 3,081,820 A | 3/1963 | Schnyder |
| 3,362,868 A | 1/1968 | Backlund |
| 3,414,038 A | 12/1968 | Laakso |

(Continued)

FOREIGN PATENT DOCUMENTS

| AU | WO 2009152570 A1 * | 12/2009 | ............ C01F 7/064 |
| CA | 1209241 | 8/1986 | |

(Continued)

OTHER PUBLICATIONS

European Search Report cited in EP 14169627, mailed Oct. 7, 2014.

*Primary Examiner* — Jose Fortuna

(74) *Attorney, Agent, or Firm* — Kerri Hochgesang; Robert Joseph Hornung

(57) ABSTRACT

An insert inlet tube assembly for a flash tank including a sidewall and an insert inlet port has been conceived, the insert inlet tube assembly may comprise: a tubular section configured to be inserted into the inlet port and fixed to the inlet port, and an insert outlet of the tubular section, and inserted into an inlet port of the chamber, wherein the insert inlet tube extends inward of the sidewall and the insert outlet has an elongated cross-sectional shape oriented substantially parallel to a center vertical axis of the flash tank and substantially perpendicular to a radial line of the flash tank, such that the insert outlet is substantially tangential to the sidewall.

11 Claims, 5 Drawing Sheets

(51) Int. Cl.
*D21C 11/04* (2006.01)
*D21C 11/06* (2006.01)

(56) References Cited

U.S. PATENT DOCUMENTS

| | | | | |
|---|---|---|---|---|
| 4,206,806 | A * | 6/1980 | Togashi | F28F 9/0221 165/175 |
| 4,551,198 | A | 11/1985 | Wiley | |
| 4,580,324 | A * | 4/1986 | Laska | B21D 41/02 29/890.049 |
| 4,730,669 | A * | 3/1988 | Beasley | F28F 9/182 165/151 |
| 4,897,157 | A | 1/1990 | Elmore et al. | |
| 4,981,629 | A * | 1/1991 | Cook | B05C 17/00516 264/261 |
| 5,100,395 | A * | 3/1992 | Rosenberg | A61M 1/0005 604/247 |
| 5,901,784 | A * | 5/1999 | Potier | F28F 9/165 138/109 |
| 6,103,058 | A * | 8/2000 | Engstrom | D21C 1/00 162/19 |
| 6,171,494 | B1 | 1/2001 | Snekkenes et al. | |
| 6,346,166 | B1 | 2/2002 | Kettunen et al. | |
| 7,493,892 | B1 * | 2/2009 | Sims, Jr. | F02M 55/025 123/456 |
| 7,549,465 | B2 * | 6/2009 | Gong | F28F 9/02 165/150 |
| 7,785,514 | B2 * | 8/2010 | McCarthy | B29C 45/0013 264/245 |
| 7,895,870 | B2 * | 3/2011 | Hayashi | B21B 21/005 72/208 |
| 7,955,421 | B2 * | 6/2011 | Hunt | B01D 19/0036 95/261 |
| 8,196,909 | B2 * | 6/2012 | Daly | B01D 5/0009 165/133 |
| 8,685,205 | B2 * | 4/2014 | Nellis | D21C 7/10 162/232 |
| 8,910,702 | B2 * | 12/2014 | Daly | B01D 5/009 165/111 |
| 9,103,070 | B2 * | 8/2015 | Hunt | D21C 11/00 |
| 9,127,403 | B2 * | 9/2015 | Grogan | D21C 11/00 |
| 9,139,956 | B1 * | 9/2015 | Hunt | D21C 11/00 |
| 2009/0065185 | A1 * | 3/2009 | Jekerle | F28D 7/106 165/175 |
| 2010/0224335 | A1 | 9/2010 | Tikka | |
| 2011/0139794 | A1 * | 6/2011 | Pham | F04C 29/042 220/565 |
| 2013/0206346 | A1 | 8/2013 | Hunt et al. | |
| 2014/0238095 | A1 * | 8/2014 | Rossbach | B21C 37/083 72/52 |
| 2015/0315745 | A1 * | 11/2015 | Grogan | D21C 11/00 162/232 |

FOREIGN PATENT DOCUMENTS

| | | | |
|---|---|---|---|
| CN | 201921537 | 8/2011 | |
| EP | 2626462 | 8/2013 | |
| EP | 2626462 A1 * | 8/2013 | D21C 11/00 |
| EP | 2692944 A1 * | 2/2014 | D21C 11/0071 |
| EP | 2626462 B1 * | 10/2014 | D21C 11/00 |
| JP | 2000283677 A * | 10/2000 | |
| JP | 2013227710 A * | 11/2013 | |
| WO | 99/54515 | 10/1999 | |

* cited by examiner

FLARED INLET INSERT FOR INTRODUCING FLOW INTO A FLASH TANK

RELATED APPLICATION

This application is a continuation application claiming the benefits of U.S. Non-provisional patent application Ser. No. 14/272,941 filed May 8, 2014 now U.S. Pat. No. 9,127,403, the entirety of which is incorporated herein by reference; the Ser. No. 14/272,941 application in turn claims the benefit of priority to U.S. Provisional Application Ser. No. 61/827,830, filed May 28, 2013, the entire contents of which are incorporated herein by reference.

BACKGROUND OF THE INVENTION

1. Technical Field

The present disclosure relates generally to flashing fluids extracted from pressurized reactor vessels and particularly to flash tanks for flashing black liquor from a pressurized reactor vessel in a pulping or biomass treatment system.

2. Related Art

Flash tanks are generally used to flash a high pressure fluid liquor stream including steam and condensate. A flash tank typically has a high pressure inlet port, an interior chamber, an upper steam or gas discharge port and a lower condensate or liquid discharge port. Flash tanks safely and efficiently reduce pressure in a pressurized fluid stream, allow recovery of heat energy from the vapors produced by the stream, and collect chemicals from the condensate of the stream.

Flash tanks may be used to recover chemicals from chemical pulping systems, such as Kraft cooking systems. Flash tanks are also used in other types of cooking systems for chemical and mechanical-chemical pulping systems. To pulp wood chips or other comminuted cellulosic fibrous organic material (collectively referred to herein as "cellulosic material"), the cellulosic material is mixed with liquors, e.g., water and cooking chemicals, and pumped in a pressurized treatment vessel. Sodium hydroxide, sodium sulfite, and other alkali chemicals can be used to "cook" the cellulosic material such as in a Kraft cooking process. These chemicals tend to degrade and solubilize lignin as well as hemicellulose and cellulose compounds in the cellulosic material. The Kraft cooking process is typically performed at temperatures in a range of 100 degrees Celsius (100° C.) to 170° C. and at pressures at, greater than, or substantially greater than atmospheric pressure, such as above 5 bar gauge to 15 bar gauge. In other conventional cooking processes, the cellulosic material may be treated with water or an acid to initiate acid hydrolysis with the focus of solubilizing primarily hemicellulose compounds.

The cooking (reactor) vessels may be batch or continuous flow vessels. The cooking vessels are generally vertically oriented and may be sufficiently large to process 1,000 tons or more of cellulosic material per day. In continuous flow vessels, the material continuously enters and leaves the vessel, and remains in the vessel for multiple minutes or as much as several hours. In addition to the cooking vessel, a conventional pulping system may include other reactor vessels (such as vessels operating at or near atmospheric pressure or pressurized above atmospheric pressure) such as for impregnating the cellulosic material with liquors prior to the cooking vessel. In view of the large amount of cellulosic material in the impregnation and cooking vessels, a large volume of black liquor is typically extracted from these vessels.

The black liquor generally includes the cooking chemicals and organic chemicals or compounds, e.g., hydrolysate, residual alkali, lignin, hemicellulose, and other dissolved organic substances, dissolved from the cellulosic feed materials. The black liquor is typically flashed in a flash tank to generate steam and condensate. The cooking chemicals and organic compounds are generally included with the liquid fraction after flashing. The steam formed from flashing is generally free of the cooking chemicals and organic compounds. The liquid fraction may be processed, for example, to recover and recausticize the cooking chemicals. The steam may be used as heat energy in the pulping system.

In conventional flash tanks, the black liquor usually enters through an inlet pipe coupled to an inlet port on a sidewall of the tank. Other conventional flash tanks may position the inlet port on the top of the vessel. The inlet port is typically a circular or oval-shaped opening in the sidewall of the flash tank. Black liquor typically flows from the inlet pipe into the flash tank. The transition from the inlet pipe to the flash tank is abrupt, which causes disruption and turbulence in the liquor flowing into the flash tank.

BRIEF DESCRIPTION OF THE INVENTION

In an exemplary embodiment, a flash tank has been conceived, the flash tank may include: an interior chamber having a interior surface formed by a sidewall of the flash tank, a vapor exhaust port coupled to an upper portion of the chamber, a liquid discharge port coupled to a lower portion of the chamber, an insert inlet tube having an insert outlet and inserted into an inlet port of the chamber, wherein the insert inlet tube extends inward of the sidewall and the insert outlet has an elongated cross-sectional shape oriented substantially parallel to a center vertical axis of the flash tank and substantially perpendicular to a radial line of the flash tank, such that the insert outlet is substantially tangential to the sidewall.

The insert inlet tube may have a longitudinal axis that is perpendicular to a line extending radially from the vertical axis of the flash tank. The insert inlet tube assembly may have an insert outlet that is substantially aligned with a radial line extending perpendicular to the vertical axis of the flash tank and a longitudinal axis of the insert inlet tube. The insert inlet tube may include a cylindrical section having a circular cross-section centered on the longitudinal axis, and a flared section between the circular section and the insert outlet, wherein the flared section is gradually offset from the longitudinal axis of the cylindrical section toward a sidewall of the flash tank proximate to the insert outlet. The cross-sectional area of the insert inlet tube may be substantially uniform along the length of the tube.

In another exemplary embodiment, an insert inlet tube assembly for a flash tank including a sidewall and an insert inlet port has been conceived, the insert inlet tube assembly may comprise: a tubular section configured to be inserted into the inlet port and fixed to the inlet port, and an insert outlet of the tubular section, and inserted into an inlet port of the chamber, wherein the insert inlet tube extends inward of the sidewall and the insert outlet has an elongated cross-sectional shape oriented substantially parallel to a center vertical axis of the flash tank and substantially perpendicular to a radial line of the flash tank, such that the insert outlet is substantially tangential to the sidewall.

An exemplary insert inlet tube may be made of metal, polymer, or other material configured to withstand the pressure, temperature, and corrosiveness of the feed material that may pass through the insert inlet tube. For example, when the feed material is black liquor, an exemplary insert inlet tube may be made of stainless steel or other suitable material configured to withstand the corrosiveness of the black liquor, temperature, and pressure at which the black liquor is conveyed through the insert inlet tube.

In yet another exemplary embodiment, the inlet insert tube may further comprise a wear tip constructed of wear-resistant materials such as metals, polymers, or other material configured to withstand the pressure and temperature of flow material for extended time periods. Exemplary wear-resistant materials may be stainless steel, titanium, and tungsten. In other exemplary embodiments, the wear-resistant material may overlay the material of the insert inlet tube.

An exemplary tubular section may include a section having a circular cross section and a longitudinal axis. The flared section may be between the circular section and the insert outlet, wherein the flared section is gradually offset from the longitudinal axis toward a sidewall of the flash tank proximate to the insert outlet. The insert inlet tube assembly may further comprise at least one gusset fixed to the tubular section and extending longitudinally along a portion of the section.

In yet another exemplary flash tank a cross-sectional area of an initial length of the insert inlet tube may be substantially greater than a flared section of the insert inlet tube.

An exemplary method to flash a pressurized liquor has been conceived comprising: feeding a pressurized liquor to an insert inlet tube of a flash tank, wherein the insert inlet tube extends beyond an inside surface of a sidewall of the flash tank and includes an insert outlet adjacent an inside surface of the sidewall; smoothly flowing the pressurized liquor from the insert inlet tube, through the insert outlet, and onto the inside surface of the sidewall; flashing the pressurized liquor as the liquor flows onto the inside surface of the sidewall; exhausting a vapor exhaust formed by the flashing through an upper portion of the chamber, and discharging a liquid formed by the flashing from a lower portion of the chamber.

The method may further comprise flowing the pressurized liquor through the insert inlet tube, wherein a cross-sectional area of an initial length of the insert inlet tube may be substantially greater than a flared section of the insert inlet tube.

BRIEF DESCRIPTION OF THE DRAWINGS

The foregoing will be apparent from the following more particular description of exemplary embodiments of the disclosure, as illustrated in the accompanying drawings in which like reference characters refer to the same parts throughout the different views. The drawings are not necessarily to scale, with emphasis instead being placed upon illustrating the disclosed embodiments.

DETAILED DESCRIPTION OF THE INVENTION

Figure 1:
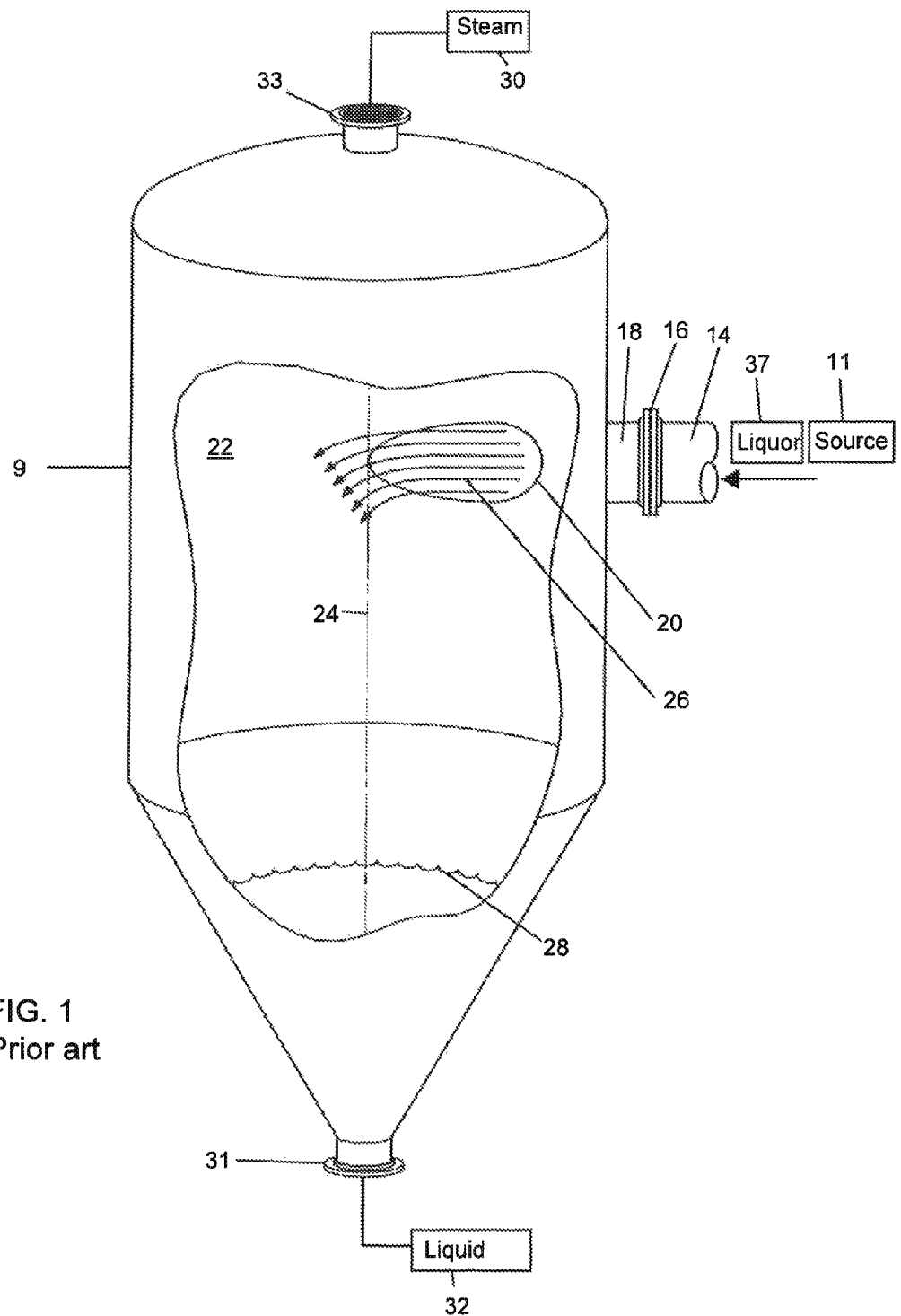
FIG. 1 is a schematic diagram of a conventional flash tank receiving black liquor, wherein a portion of the sidewall of the tank has been cut away to show the inlet port for the liquor entering the tank.

FIG. 1 is a schematic diagram of a conventional flash tank 9 coupled to a source 11 of black liquor 37. The source 11 of black liquor 37 may be a header 14, e.g., a cylindrical header or a mixing spool that receives and combines black liquor 37 from multiple streams into a single stream 26 that enters the flash tank 9, but the black liquor 37 may also be extracted from a pressurized batch or continuous digester vessel in a Kraft cooking process for producing pulp. The header 14 may have an internal passage (see FIG. 2) for the black liquor 37 having a circular cross-section.

The black liquor flows 37 from the header 14 through a flanged coupling 16 into an inlet port 18. As the black liquor 37 exits the inlet port 18 through a conventional outlet 20, the black liquor 37 becomes a stream 26 of black liquor 37. The transition from the conventional outlet 20 to the inside sidewall surface 22 of the flash tank 9 is abrupt. Disruption and turbulence can occur as the stream 26 of black liquor 37 exits the conventional outlet 20 in a non-uniform manner.

From the inlet port 18, the black liquor 37 passes through a conventional outlet 20 on the inside sidewall surface 22 of the conventional flash tank 9. The inside sidewall surface 22 is a generally cylindrical, continuously curved, or curvilinear surface, such that the inside sidewall surface defines an interior chamber. The conventional outlet may be circular in cross-section, especially if a longitudinal axis (see 40 in FIG. 2) of the inlet port 18 is coaxial to a radial line that intersects a center vertical axis 24 of the conventional flash tank 9. If the inlet port is not aligned substantially perpendicular to center vertical axis 24, the cross-section of the conventional outlet 20 is elliptical. The stream 26 of black liquor 37 flows from the conventional outlet 20 and falls from the conventional outlet 20 to the surface 28 of the liquid in the conventional flash tank 9, thereby further contributing to disruption and turbulence in the conventional flash tank 9.

As the stream 26 of black liquor enters the conventional flash tank 9, the pressure on the liquor is released. The pressure on the liquor in the header 14 may be substantially above atmospheric pressure, such as above 5 bar gauge or above 10 bar gauge. The pressure within the interior chamber of a conventional flash tank 9 may be substantially at atmospheric pressure, such as 0.1 to 1.5 bar gauge. As the stream 26 of black liquor 37 enters the conventional flash tank 9, the pressure release causes steam and other vapor in the black liquor 37 to "flash", which means to change phase from a liquid to a vapor, and separate from the remaining liquid, e.g., condensate, of the black liquor. The flashed steam and other vapors 30 are vented from vapor exhaust port 33 at an upper portion of the conventional flash tank 9. The liquid-condensed black liquor 32 is extracted from a liquid discharge port 31 at a lower portion of the conventional flash tank 9.

Figure 2:
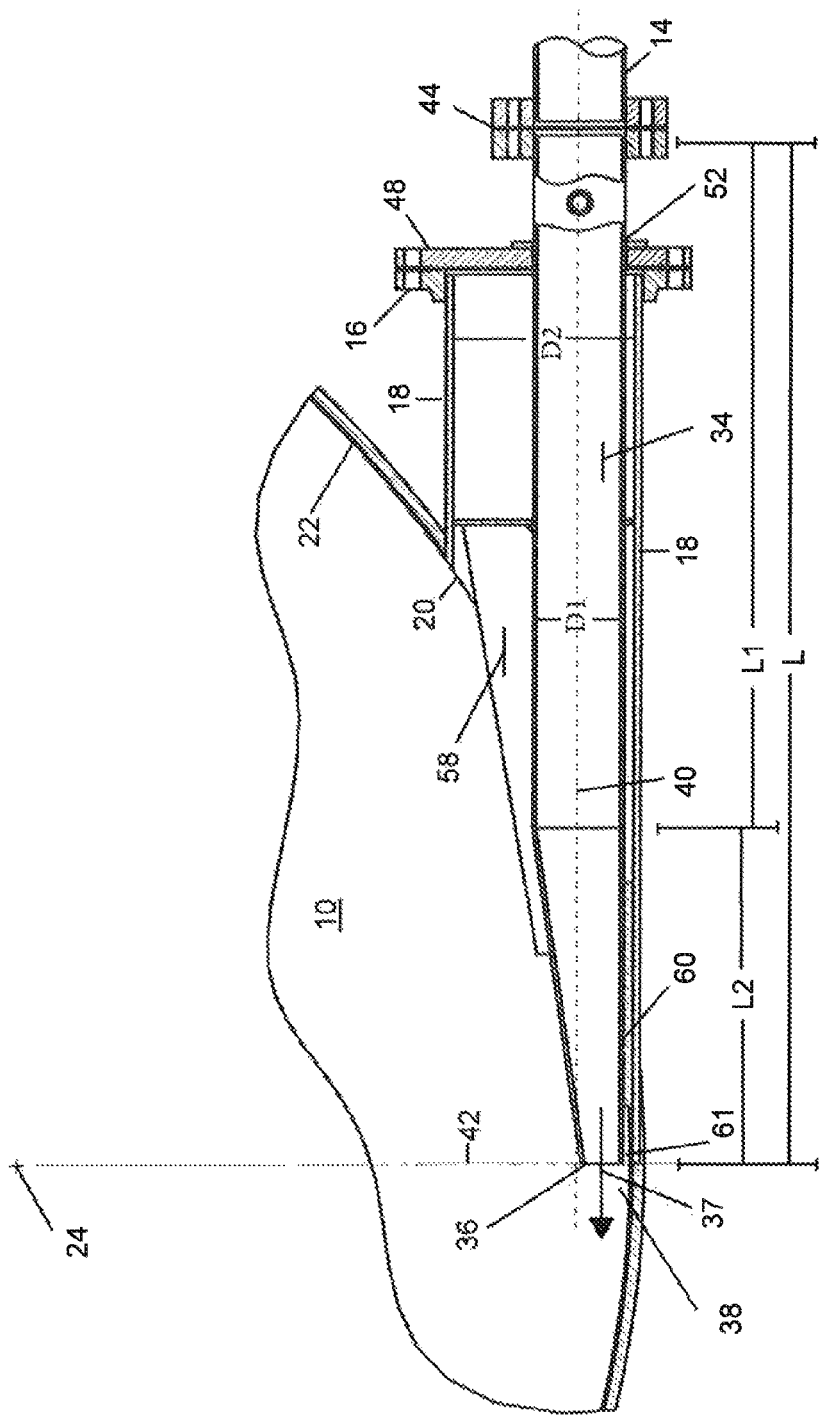
FIG. 2 is a top-down cross-sectional view of a portion of an exemplary flash tank of the present disclosure, having an inserted inlet tube wherein the cross-section is taken at an elevation of the inlet port.

FIG. 2 is a top-down cross-sectional view of a portion of an exemplary flash tank 10 of the present disclosure, wherein the cross-section is taken at an elevation of the inlet port 18. The flash tank 10 has been modified from the configuration shown in FIG. 1 by adding a hollow insert inlet tube 34 in the inlet port 18. The insert inlet tube 34 may have an inlet coupling 44 to the header 14 and may have an insert outlet 36. The insert outlet 36 may be adjacent to or separated by a narrow gap 61, e.g., less than 6 inches to less than 1 inch (less than 152 millimeters to less than 25 millimeters) from a region 38 of the inside sidewall surface 22.

The region 38 may be generally parallel to the longitudinal axis 40 of the insert inlet tube. In one configuration, the insert outlet 36 extends to a line 42 that extends through the center vertical axis 24 of the flash tank 10. It is not necessary for the insert outlet 36 to be aligned with the line 42, however in the exemplary embodiments disclosed herein, the insert outlet 36 is within a distance from the line 42 that is less than 25 percent of the diameter of the flash tank 10. An advantage of having the insert outlet 36 near a region 38 of the inside sidewall surface 22 is that the flow of black liquor 37 from the insert outlet 36 flows directly and smoothly onto the inside sidewall surface 22 without extensive disruption or turbulence in the flow. The flow of black liquor 37 from the insert outlet 36 is substantially tangential to the region 38 of the inside sidewall surface 22.

Figure 3:
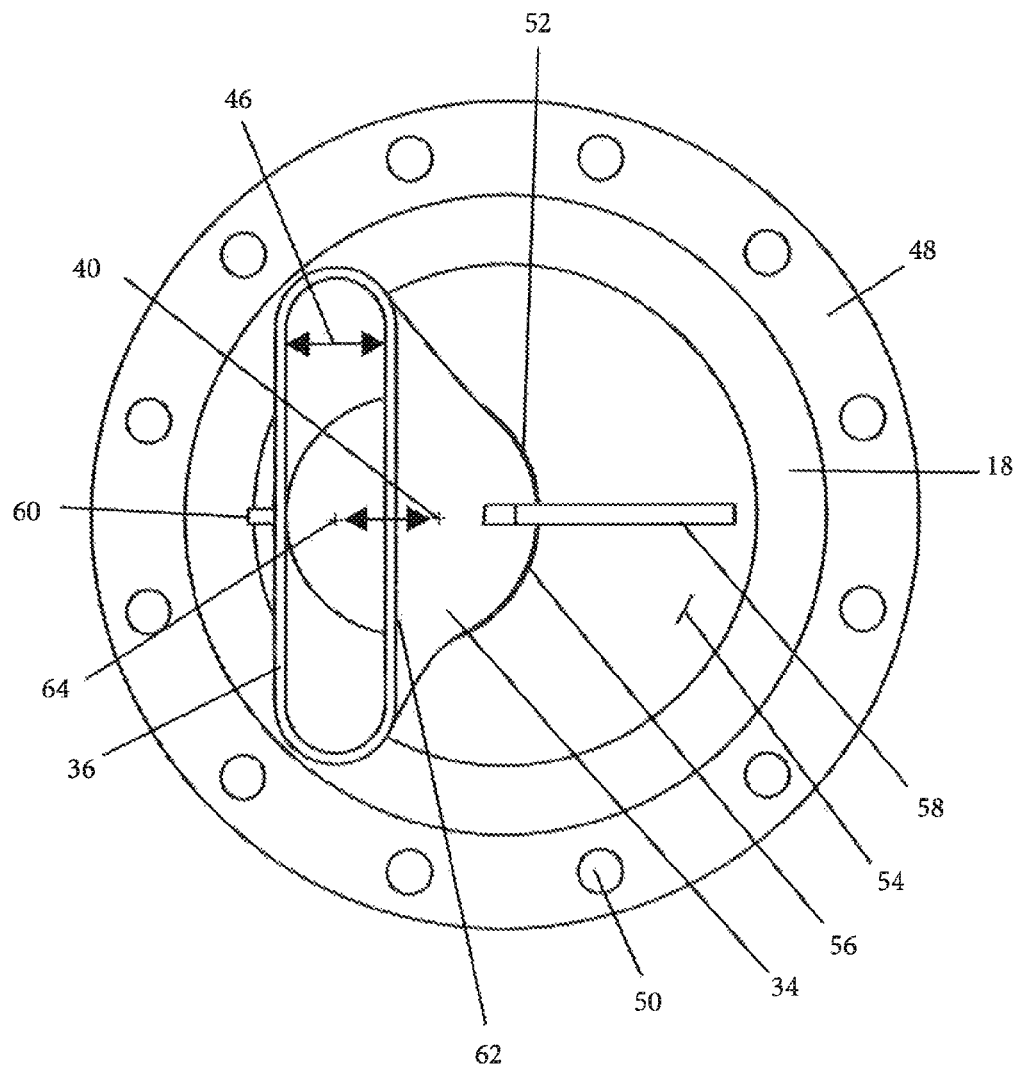
FIG. 3 shows a front view of an exemplary inlet tube assembly of the present disclosure.

The cross-sectional area of the insert inlet tube 34 may be generally uniform along the entire length (L) of the tube. A portion of the cross-section of the insert inlet tube 34 may be circular from the inlet coupling 44 of the header 14 to the start of the flare ($L_1$). The portion ($L_1$) of the insert inlet tube 34 may have a longitudinal axis 40. Along the flare section ($L_2$), (See 62 in FIG. 4) of the insert inlet tube 34, the cross-section gradually changes from a circle to an oval, race-track, or other elongated shape 46, such as shown in FIG. 3, a geometric stadium shape. An advantage of the elongated shape 46 of the insert outlet 36 is that the black liquor 37 exits the insert outlet 36 at a higher velocity than conventional outlets 20 and in much greater proximity to the inside sidewall surface 22 than a conventional flash tank 9.

The insert inlet tube 34 may be designed such that its cross-sectional area remains substantially constant along the length (L) of the insert inlet tube 34. Substantially constant refers to a cross-sectional area that does not change by more than ten percent over the length (L) insert inlet tube 34. Maintaining a substantially constant cross-sectional area assists in minimizing the disruptions, e.g., turbulence and non-laminar flow, in the black liquor 37 flowing through the insert inlet tube 34. Maintaining a substantially constant cross-sectional area along the length (L) of the insert inlet tube 34 allows the black liquor 37 to flow through the insert inlet tube 34 at a substantially constant velocity. Similarly, maintaining smooth inside walls of the insert inlet tube 34 and gradual changes in the cross-sectional shape of the insert inlet tube 34 minimize disruptions in the flow of black liquor 37. Further, matching the cross-sectional area and the diameter ($D_1$) of the initial length ($L_1$) of the insert inlet tube 34 to the cross-sectional area and diameter ($D_1$) of the header 14 avoids disruptions in the flow through the transition, e.g., inlet coupling 44, between the header 14 and insert inlet tube 34.

In another exemplary embodiment, the diameter ($D_1$) of the initial length ($L_1$) of the insert inlet tube 34 may define a cross-sectional area that is substantially greater than the cross-sectional area of a flared section ($L_2$), (See 62 in FIG. 4) of the insert outlet 36. Substantially greater refers to a cross-sectional area that changes by more than ten percent over the length (L) of the insert inlet tube 34.

The insert inlet tube 34 may be inserted into a conventional inlet port 18 of a flash tank 10. The diameter ($D_2$) of the inlet port 18 may be substantially larger e.g. twice the diameter ($D_1$) of the insert inlet tube 34. To mount the insert inlet tube 34 in the inlet port 18, brackets and other mounting devices are fixed to the insert inlet tube 34. These mounting devices include a circular plate 48 coupled to the flanged coupling 16 of the inlet port 18. The circular plate 48 seals the end of the inlet port 18 and has openings 50 to receive fasteners, e.g., bolts, to secure the circular plate 48 to the flanged coupling 16. The circular plate 48 has an opening 52 that receives and supports the insert inlet tube 34. The opening 52 may be offset from the center of the circular plate 48 in a direction towards the region 38 of the inside sidewall surface 22 of the tank 10 to be adjacent to the insert outlet 36 of the insert inlet tube 34.

FIG. 3 is a front view of an exemplary inlet tube 34.

A circular brace plate 54, which is typically metal, but could be another suitable material, fits in the inlet port 18 (shown in FIG. 2) and has substantially the same diameter as the inside diameter ($D_2$) of the inlet port 18 (shown in FIG. 2). The circular brace plate 54 has an opening 56 for the insert inlet tube 34 and supports, e.g., is welded to, the insert inlet tube 34. The circular brace plate 54 may be generally perpendicular to the longitudinal axis 40 of the insert inlet tube 34 and the inlet port 18 (shown in FIG. 2). A first gusset 58, e.g., metal or other material sufficient to support the insert inlet tube 34, may be a triangular plate, which provides longitudinal support for the insert inlet tube 34 and extends from the circular brace plate 54 down a portion of the length of the insert inlet tube 34. The first gusset 58 may be fixed, e.g., welded, to an outer surface of the insert inlet tube 34 to provide the longitudinal support of the insert inlet tube 34.

A second gusset 60 is on the side of the insert inlet tube 34 adjacent the region 38 of the inside sidewall surface 22 and near the insert outlet 36 of the insert inlet tube 34. The second gusset 60 may be a relatively narrow (as compared to the first gusset 58) rib that is less than an inch (25 mm) high and wide. The second gusset 60 is fixed to the insert inlet tube 34 to provide stiffening of the insert inlet tube 34 and structural support to the insert inlet tube 34. The second gusset 60 may seat against the inside wall 38 of the tank or inlet port 18. The second gusset 60 may also minimize vibration of the insert outlet 36 against the inside sidewall surface 22 of the flash tank 10. Due to possible vibration between the insert outlet 36 and the inside sidewall surface 22 of the flash tank 10, a narrow gap 61 of less than an inch (25 mm) may be formed between the insert outlet 36 and the flash tank 10. The narrow gap 61 may be determined by the dimensions of the second gusset 60.

The flared section 62 of the insert inlet tube 34 may be offset from the longitudinal axis 40 of the circular in cross-section portion ($L_1$) of the insert inlet tube 34. The offset 64 assists in positioning the insert outlet 36, and hence the flow of black liquor (37 in FIG. 2), near the inside sidewall surface 22 and region 38 of the flash tank 10. The shape 46 of the insert outlet 36 may also be used to cause black liquor to flow from the insert outlet 36 smoothly and directly on the inside sidewall surface 22 of the flash tank 10. The shape 46 may be elongated in a direction parallel to the center vertical axis (24 in FIG. 2 and FIG. 5) of the flash tank 10. The shape 46 allows for black liquor 37 to enter the interior chamber (see FIG. 5) of the flash tank 10 at higher velocities than black liquor 37 flowing through conventional outlets 20. In exemplary embodiments, the black liquor and vapor 37 may enter the flash tank 10 at a velocity ranging from 10 feet per second (ft/sec) to 5000 feet per second.

Figure 4:
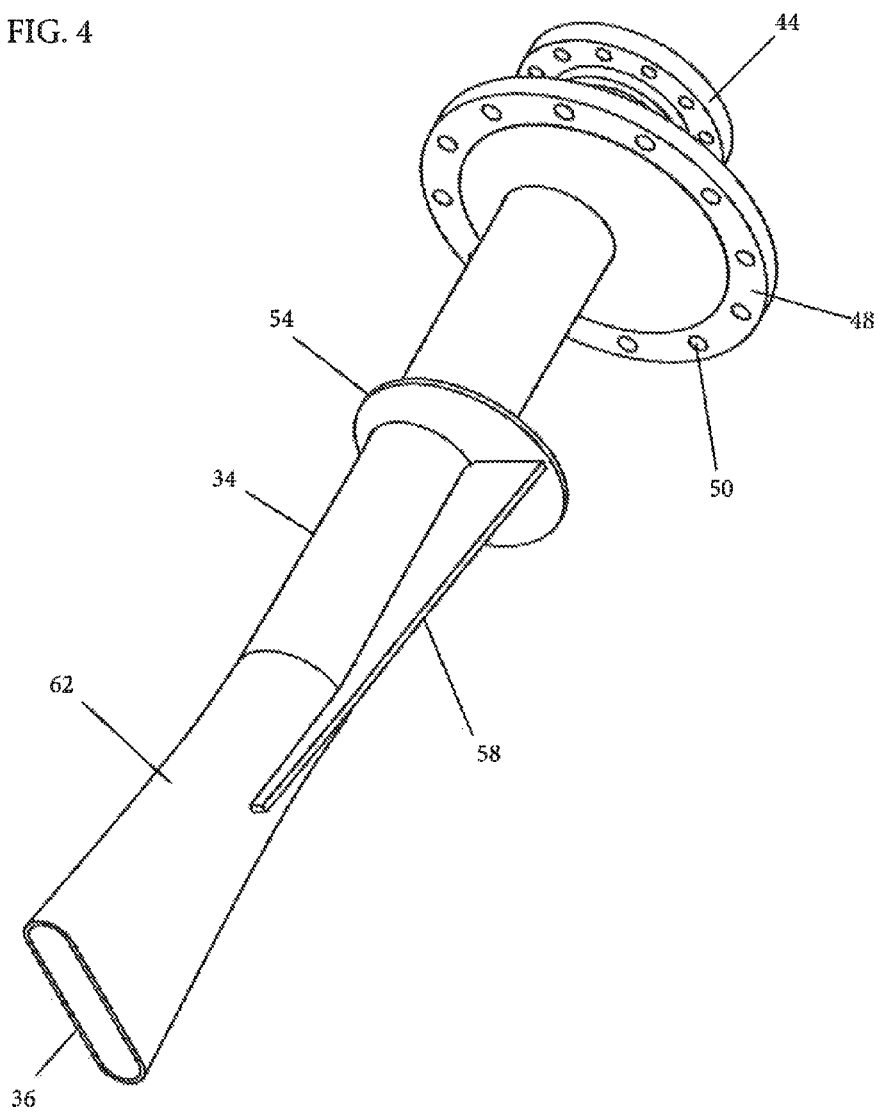
FIG. 4 is a perspective view of an exemplary inlet tube assembly of the present disclosure.

FIG. 4 is a perspective view of an exemplary embodiment of the insert inlet tube 34 before being inserted into the inlet port 18 of a flash tank 10. The insert inlet tube 34 may be prefabricated to include a flange for the inlet coupling 44 to the header 14, the circular plate 48 to be mounted to the flange 16 of the inlet port 18, the circular brace plate 54 that slides into and seats against the insert inlet tube 34, and the first gusset 58 and second gusset 60 that provide stiffening and longitudinal support to the insert inlet tube 34. Further, the insert inlet tube 34 may be prefabricated such that the flared section 62 is formed to have a shape 46 that has a race-track profile. The shape 46 of the insert outlet 36 may be prefabricated before the insert inlet tube 34 is inserted into the flash tank 10.

In another exemplary embodiment, the flash tank 10 may be designed without a large diameter inlet port 18 and to receive the insert inlet tube 34 directly. Appropriate supports for the insert inlet tube 34 may be placed on the inside and outside of the inside sidewall surface 22 of the flash tank 10 to support the insert inlet tube 34. The insert outlet 36 may have an edge that is fixed, e.g., welded to the flash tank 10, to promote uniform flow of black liquor from the insert inlet tube 34 to the inside sidewall surface 22 of the flash tank 10.

Figure 5:
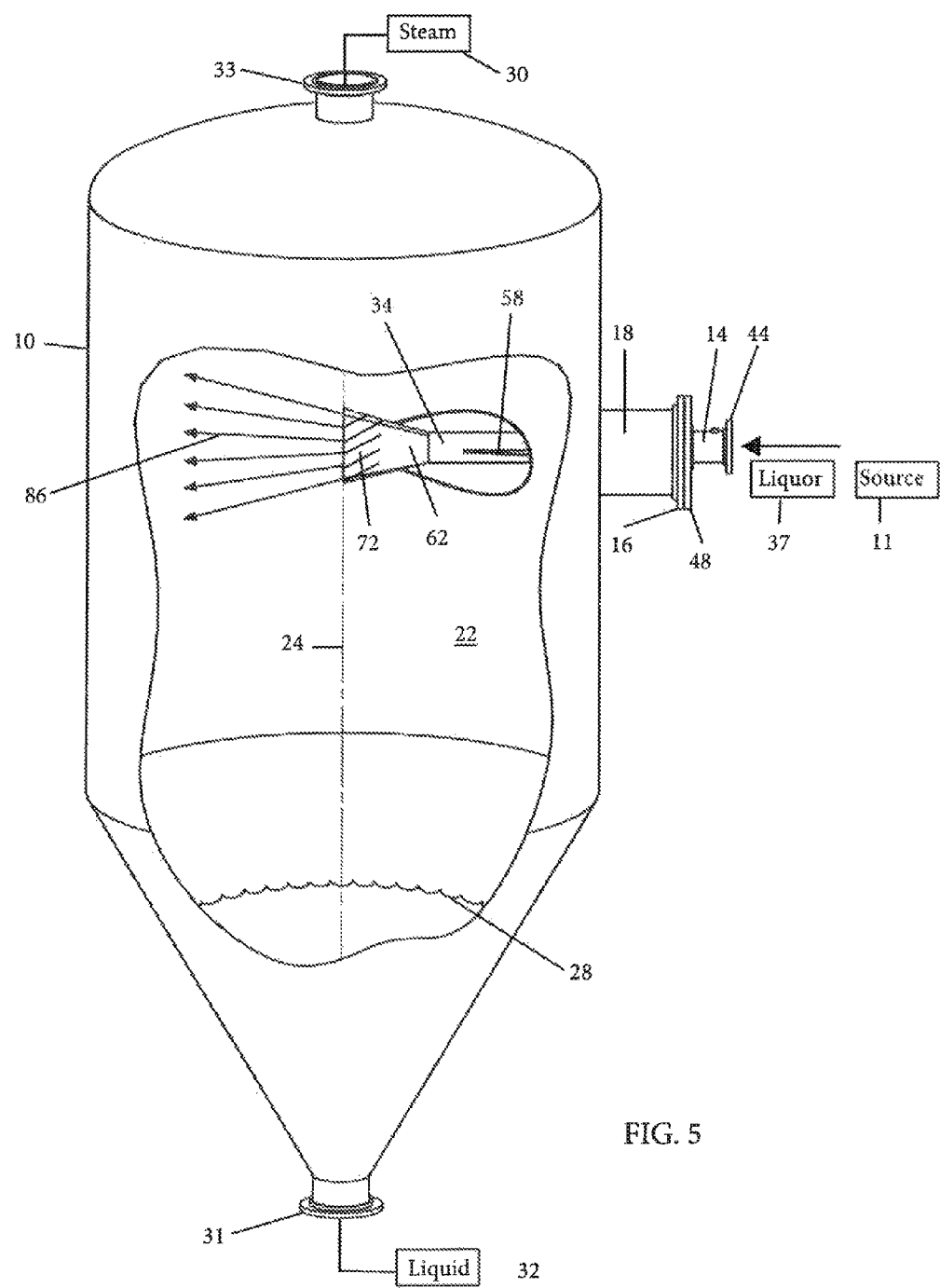
FIG. 5 is a schematic diagram of an exemplary inlet tube assembly of the present disclosure feeding black liquor into a flash tank, wherein a portion of the sidewall of the flash tank has been cut away to show an exemplary inlet port of the inlet tube assembly.

FIG. 5 is side view of an exemplary insert inlet tube 34 after being inserted into the inlet port 18 of a flash tank 10. A flow of black liquor 37 enters the header 14 and flows through the insert inlet tube 34 and flared section 62 respectively. The flared region may further comprise a wear-tip 72 made from materials configured to withstand the pressure, temperature, and corrosiveness of the flow of black liquor 37. In an exemplary embodiment, the wear-tip 72 may comprise the entire flared section 62. In other exemplary embodiments, the wear-tip 72 may comprise a portion of the flared region proximate to the insert outlet 36. In yet other exemplary embodiments, the wear-tip 72 may overlay all or a portion of the flared section 62. The insert outlet 36 is substantially tangential to the center vertical axis 24 of the flash tank 10.

A shape 46 that is race-track, oval, or other elongated opening oriented parallel to the center vertical axis 24 of the flash tank 10 aids in causing the black liquor to flow smoothly and with minimal disruption from the insert outlet 36 onto the inside sidewall surface 22 of the flash tank 10. The shape 46 allows for the black liquor 37 to enter the flash tank 10 at a higher velocity than black liquor 37 in conventional flash tanks. In exemplary embodiments, the black liquor 37 may enter the flash tank in a range of 10 ft/sec to 5000 ft/sec and a range or a series of ranges there between. The high velocity of the black liquor 37 and the inset outlet 36 being located perpendicular to a radial line intersecting the center vertical axis 24 of the flash tank 10 allows the black liquor entering the flash tank 10 to form a separation stream 86. This separation stream may be a centrifugal separation stream 86 that flows tangentially and downwardly along the inside sidewall surface 22 onto and into the surface 28 of the liquid in the flash tank 10. As the black liquor 37 flows onto the inside sidewall surface 22, the stream 26 of black liquor 37 expands and narrows along the inside sidewall surface 22. The separation stream 86 may form sheaths or layers of black liquor 37 along the inside sidewall surface 22. The expansion and narrowing of the separation stream 86 promotes the release of steam and other vapors 30 from the black liquor. Similarly, reducing the disturbances in the flow of black liquor 37 promotes the release of steam and other vapors 30 from the black liquor 37.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An insert inlet tube assembly in a flash tank including a sidewall and an inlet port, the insert inlet tube assembly comprising:
    a tubular section configured to be inserted into the inlet port and fixed to the inlet port, and
    an insert outlet of the tubular section, and inserted into an inlet port of the chamber, wherein the insert inlet tube extends inward of the sidewall and the insert outlet has an elongated cross-sectional shape oriented substantially parallel to a center vertical axis of the flash tank and substantially perpendicular to a radial line of the flash tank, such that the insert outlet is substantially tangential to the sidewall.

2. The insert inlet tube assembly as in claim 1, wherein the tubular section comprises an initial length including a cylindrical section having a circular cross-section and a flared section.

3. The insert inlet tube assembly as in claim 2, wherein a cross-sectional area of the tubular section is substantially uniform along the length to the tubular section.

4. The insert inlet tube assembly as in claim 2, wherein the initial length has a diameter defining a cross-sectional area that is greater than a cross-sectional area of the flared section.

5. The insert inlet tube assembly as in claim 1, wherein the insert outlet is substantially aligned with a radial line extending perpendicular to the vertical axis of the flash tank and a longitudinal axis of the insert inlet tube.

6. The insert inlet tube assembly as in claim 1, wherein the tubular section includes a section having a circular cross section and the longitudinal axis, and a flared section between the circular section and the insert outlet, wherein the flared section is gradually offset from the longitudinal axis towards a sidewall of the flash tank proximate to the insert outlet.

7. The insert inlet tube assembly as in claim 1 further comprising at least one gusset fixed to the tubular section and extending longitudinally along a portion of the section.

8. The insert inlet tubular assembly as in claim 1, wherein the insert outlet is shaped as an oval.

9. The insert inlet tubular assembly as in claim 1, wherein the insert outlet is shaped as a geometric stadium.

10. The insert inlet tubular assembly as in claim 1, wherein the insert outlet is shaped as a substantially elongated shape and the insert outlet is configured to introduce black liquor into the flash tank at a range of 10 feet per second to 5,000 feet per second.

11. The insert inlet tubular assembly as in claim 1, wherein the flared section of the insert inlet tube further comprises a wear-tip.

* * * * *